United States Patent
Pattnaik et al.

(10) Patent No.: US 9,400,728 B2
(45) Date of Patent: Jul. 26, 2016

(54) CROSS PLATFORM WORKFLOW MANAGEMENT

(71) Applicant: Wal-Mart Stores, Inc., Bentonville, AR (US)

(72) Inventors: Suman Pattnaik, Bentonville, AR (US); Michael Rex, Bentonville, AR (US); Suchithra Jayakumar, Bentonville, AR (US); John Davies, Bentonville, AR (US); Nelson Gelua, Bentonville, AR (US); Madhusmita Rath, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 390 days.

(21) Appl. No.: 13/740,325

(22) Filed: Jan. 14, 2013

(65) Prior Publication Data

US 2014/0201747 A1   Jul. 17, 2014

(51) Int. Cl.
G06F 9/46 (2006.01)
G06F 11/30 (2006.01)
G06F 11/32 (2006.01)
G06F 11/34 (2006.01)

(52) U.S. Cl.
CPC ........ *G06F 11/3006* (2013.01); *G06F 11/3089* (2013.01); *G06F 11/327* (2013.01); *G06F 11/3419* (2013.01); *G06F 11/3433* (2013.01); *G06F 11/3476* (2013.01); *G06F 2201/835* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 6,704,749 B2 * | 3/2004 | Palmer et al. | |
| 6,976,241 B2 | 12/2005 | Cruz et al. | |
| 7,085,831 B2 * | 8/2006 | Larkin | 709/223 |
| 7,386,586 B1 | 6/2008 | Headley et al. | |
| 8,170,189 B2 | 5/2012 | Alperin et al. | |
| 2002/0016871 A1 * | 2/2002 | Graf | 710/5 |
| 2005/0154625 A1 | 7/2005 | Chua et al. | |
| 2006/0020942 A1 * | 1/2006 | Ly et al. | 718/100 |
| 2009/0018891 A1 * | 1/2009 | Eder | 705/10 |
| 2009/0125350 A1 | 5/2009 | Lessing et al. | |
| 2012/0130738 A1 | 5/2012 | Hernandez et al. | |
| 2012/0166231 A1 * | 6/2012 | Denker et al. | 705/5 |
| 2012/0173724 A1 | 7/2012 | Kache et al. | |
| 2013/0111484 A1 * | 5/2013 | Chen et al. | 718/102 |

OTHER PUBLICATIONS

International Search Report & Written Opinion in counterpart international patent application No. PCT/US14/10957, mailed on Jun. 10, 2014; 10 pages.
International Preliminary Report on Patentability in counterpart International Patent Application No. PCT/US14/10957, mailed on Jul. 23, 2015; 9 pages.

* cited by examiner

*Primary Examiner* — Lewis A Bullock, Jr.
*Assistant Examiner* — Wynuel Aquino
(74) *Attorney, Agent, or Firm* — Schmeiser, Olsen & Watts LLP

(57) ABSTRACT

A method and system for real-time monitoring of processes to obtain job data of jobs running on different non-compatible platforms with a Java monitoring agent, then saving, reporting and making the job data available at any time for viewing by a system administrator on a single display monitor.

21 Claims, 6 Drawing Sheets

CROSS PLATFORM WORKFLOW MANAGEMENT

FIELD OF THE INVENTION

The present invention relates generally to a system and method of cross platform workflow management and more specifically to cross platform workflow management for monitoring and scheduling jobs running on different incompatible computer platforms.

BACKGROUND

Systems administrators for organizations that utilize various hardware and software platforms such as IBM™ mainframe, Unix™, Linux™, Java™, IBM DataStage™, etc. typically are required to separately monitor and schedule jobs on the various platforms. Disparate methods and software routines are used according to individual system requirements to obtain the status of each job running on each distinct platform. Monitoring multiple applications on different platforms is manually intensive, time consuming, difficult and complicated. Often the computer platforms are incompatible for interaction from one another. Typically, administrators must be trained and knowledgable of the operations and nuances of each individual system or platform before they can effectively handle all the required monitoring and scheduling tasks. In some cases, the information provided by each system is insufficient to accurately track the status of each job being run.

In a workplace environment such as a large retail store, there is typically a need for many different computer systems to organize and manage the various aspects of the retail business. For example, there can be a need for managing employee schedules and payroll that can be met with a Microsoft™ or Apple™ server/computer in an office area. The can be a need in the shipping area for a computerized system, perhaps an IBM mainframe system, to monitor shipping schedules for the arrival of goods to the store, and the shipping of goods to customers. A separate Unix computer system can be used to manage the store inventory. Overnight batch jobs in Java can be run for bill payment and other financial matters in the accounting department. In sum, there are many different incompatible computer platforms used in a retail store environment for running various jobs to keep the business running smoothly. Furthermore, each of the batch jobs running on a different incompatible platform must be individually separately monitored with separate periodic job summaries and displays to apprise management of crucial information.

Improvements in computer workflow management is desirable to provide accurate, up-to-date, real time status as well as scheduling of each process/job running on a group of different incompatible computer platforms.

BRIEF SUMMARY OF EMBODIMENTS

A method is provided to monitor jobs running on a plurality of non-compatible different platforms such as, but not limited to, Unix™, Linux™, Java™, IBM™ mainframe and DataStage™. This is done using a Java runtime monitoring program that monitors all jobs (i.e. processes) running on each non-compatible different platform, then reporting back and saving the monitored data to a central location for storage and viewing by a system administrator on a single display (i.e. displayed in a single location such as on a single display screen, monitor or the like). The runtime monitoring program monitors parameters such as (1) a start time, (2) an end time, (3) a current runtime, (4) an average runtime, (5) an acceptable completion time of the job defined as falling within a period equaling a sum of the average runtime and a predetermined tolerance value, whereby an alert is initiated when the current runtime of the job exceeds the acceptable completion time, and (6) an exclusion list of jobs excluded from being alerted.

A computer program product including a computer readable storage medium can include computer readable program code which operates on a computer system. The code processes the steps of: monitoring a plurality of jobs resident and running on different non-compatible platforms with a Java runtime monitoring agent which; populates a table with job data; accesses an average runtime for each of the jobs based on historical data stored in the table; determines and saves completion times of jobs to the table; determines and saves alerts and exclusions in the table; and displays the job data, including alerts, and exclusions to a single display screen or monitor for an user.

A system for monitoring and scheduling processes in a computer system includes a processor having a Java runtime monitoring agent programmed thereon for monitoring job data from a plurality of jobs resident and running on different non-compatible platforms such as, but not limited to, Unix™, Linux™, Java™, IBM™ mainframe and DataStage™. The job data is stored in a memory device and typically includes (1) a start time, (2) an end time, (3) a current runtime, (4) an average runtime and (5) a tolerance value. There parameters are monitored by the runtime monitoring agent in real time and updates are saved to the memory device. Thus at any time a system administrator can view the current status of all the jobs on a single display (i.e. displayed in a single location such as on a single display screen, monitor or the like), even though the jobs are running on disparate non-compatible platforms.

The above and other aspects of various embodiments of the present invention will become apparent in view of the following description, claims and drawings.

BRIEF DESCRIPTION OF THE SEVERAL VIEWS OF THE DRAWINGS

The accompanying drawings, in which like numerals indicate like structural elements and features in various figures, are not necessarily drawn to scale, the emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

An improved workflow system and method is described below where jobs including batch jobs running on different, incompatible computer platforms are each monitored with a Java runtime monitoring routine which then provides the real time data of the jobs for display on a single display screen so that a system administrator can receive, view and compare the status of all currently running jobs in a single table format on a single display screen. Alerts, warnings and error conditions can be provided to the table in a web application, viewed as a dashboard or a web page, in order to simply multi-process cross-platform workflow management. Additionally, jobs can be scheduled onto the different, incompatible platforms by a system administrator from the dashboard.

Preferred embodiments of a method and system for scheduling and monitoring jobs across platforms which are different and incompatible with one another are hereinafter described with reference to the various figures.

Figure 1:
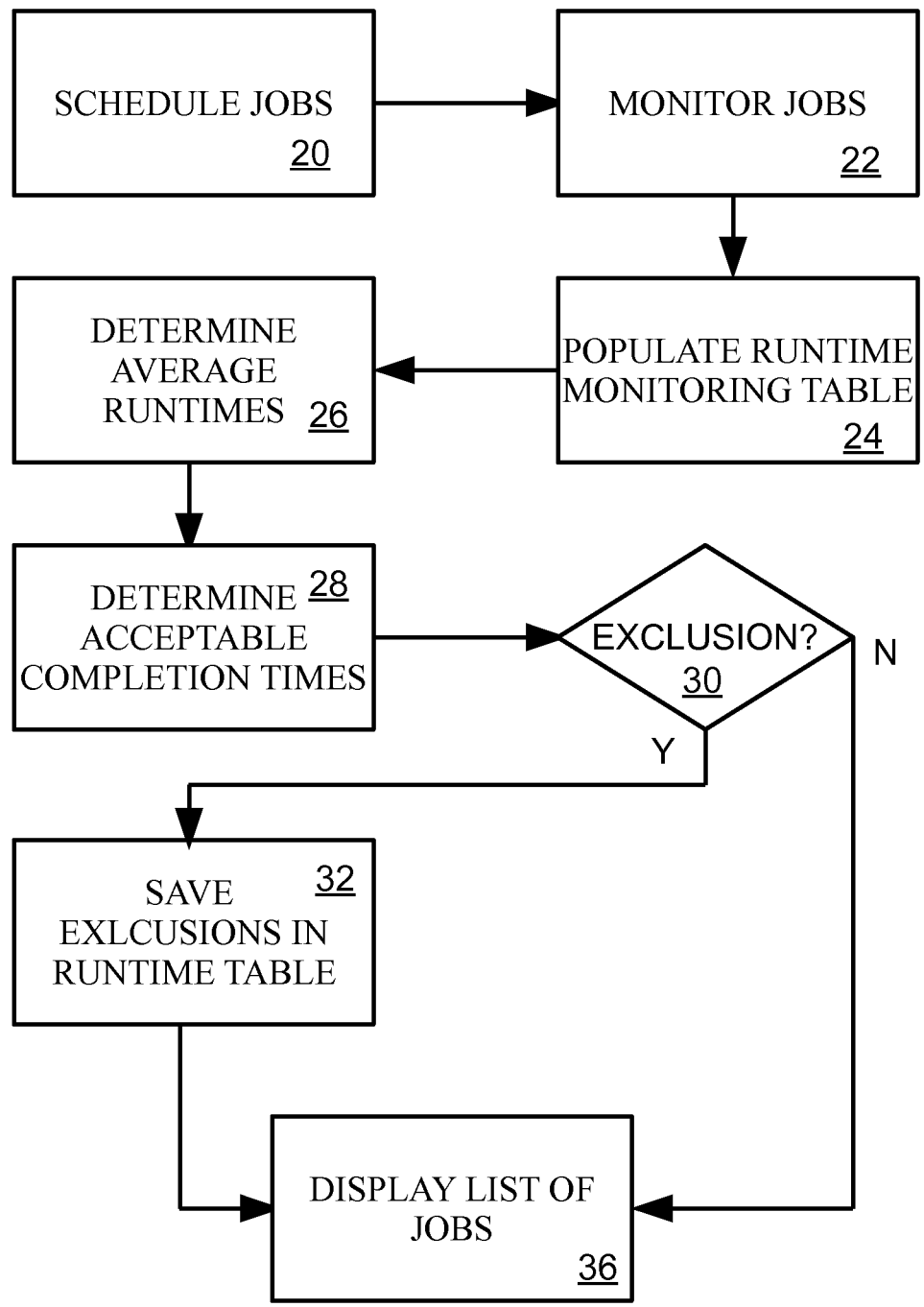
FIG. 1 is a flow chart diagram of a method for scheduling and monitoring batch jobs on cross platforms in accordance with the principles of the invention.
Figure 2:
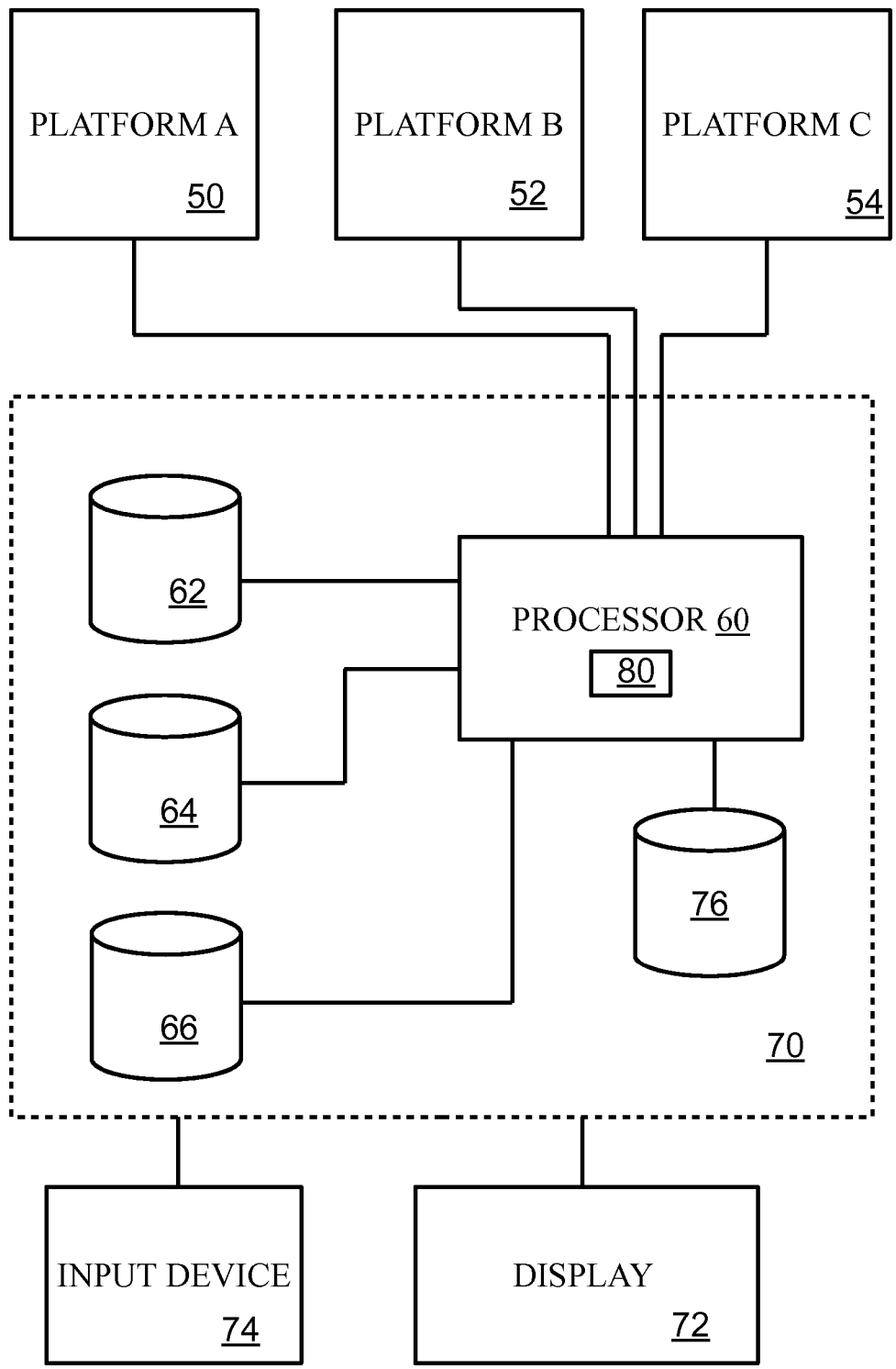
FIG. 2 is a schematical block diagram of a system for scheduling and monitoring batch jobs on cross platforms in accordance with the principles of the invention.

FIG. 1 is a flow chart diagram of a method for scheduling and monitoring batch jobs on cross platforms and FIG. 2 is a schematical block diagram of a system for scheduling and monitoring batch jobs on cross platforms. In step 20 a job is input and scheduled by an user who can be a system administrator via an input device 74 such as a keyboard or mouse into a central computer system 70. The job is selected to run on the appropriate platform A, B or C, reference numerals 50, 52 and 54, respectively. It is noteworthy that each platform is different and incompatible with the other platforms. For instance, platform A can be a Unix environment for handling jobs relating to shipping data, platform B can be a DataStage environment for handling jobs related to organizing and keeping track of goods in stock, and platform C can be an Apple computer environment for handling jobs related to employee personal records.

All scheduled jobs are saved in a Job Tracking Table 62 within the centralized computer system 70 shown in FIG. 2. The computer system 70 also includes a central processing unit 60, a Runtime Monitoring Table 64, a Job Stats Table 66 and an Oracle database 76 for administrative data used throughout the system. Although shown as separate tables in FIG. 2, various tables such as the Job Tracking Table 62, the Runtime Monitoring Table 64 and the Job Stats Table 66 can actually be combined into a single table. Also resident in the processor 60 is a Runtime Monitoring Agent 80 which is a Java routine to be explained in more detail hereafter.

An user schedules a job by selecting an inputting the following parameters: a job name, a start time and date for the job, future scheduling (such as once per week or once per year), an optional alert exclusion, the name of the user scheduling the job, a job priority rating, etc. All of this initial job information is stored in a database defined as the Job Tracking Table 62 resident on computer 70.

In step 22 jobs which are currently running are monitored by the Java software routine 80 which is also referred to as the Runtime Monitoring Agent 80. The Runtime Monitoring Agent is a software subroutine available and stored within the computer 70 and to which a copy can be sent to each new platform A, B, C, etc. where jobs are scheduled to run in order to keep an up-to-date status for each running job.

For each running job on each platform the Runtime Monitoring Agent periodically monitors and saves (1) a start time and date of the job, (2) an end time and date of the job which is determined once the job is complete, and (3) a current runtime which can be saved in minutes, hours, days or whatever time frame is desired. The current runtime is the difference between the start time and the current time. So if a job started today at 9:00 am and it is now 9:36 am of the same day, then the current runtime is 36 minutes.

Three files of data, labeled the Statistics or Stat File, the Tolerance File and the Exclusion File, are stored in the Job Stats Table 66 and are used by the Runtime Monitoring Agent 80. The Stat File is a file of average times for completion of each job. The average time, such as the mean average time, for completion of each job is calculated from historical data of the specific job. For example, a bill payment analysis and printout batch Job1 can have an average job completion time of two hours, so the Stat File would include entries for Job1 having a 2 hours or 120 minute average job completion time.

A job can be a singular task or it can be defined as a batch job comprising many facets. Also a job can have alternate designations or descriptions. For instance, a job can be defined by the completion of a series of computer based tasks, or the same job can be represented in lay terms in view of desired results. In one example, a job can be defined as providing a list of all employees, past and present, of a retail store. The same job in computer terms would be defined by a number of tasks to search various databases, retrieve data, organize the data, then printout the data.

The Tolerance File includes a time range acceptable for completion of each job. This time range can be input by a system administrator, or it can be a value determined from data from jobs acquired over time. In this example the acceptable time range for completion of J1 can be between 110 to 130 minutes.

A tolerance file labeled as RuntimeMonitor.tolerance can be formatted as follows: Level<x>|<start_duration>|<end_duration>|<tolerance_duration> with the following 7 data levels providing examples.

Level1|00000|00010|00005
Level2|00010|00060|00010
Level3|00060|00120|00030
Level4|00120|00240|00050
Level5|00240|00360|00060
Level6|00360|00540|00120
Level7|00540|01000|00360

The 7 various data level examples above have acceptable completion time ranges between 0 and 1000 minutes. Level 1 provides data whereby any job with an average execution time falling between 0 and 10 minutes will be allowed 5 minutes of tolerance. In other words, if Level 1 is applied to a Job01 normally having a 3 minute average runtime, then the Job01 process can run for 8 minutes total before an alert occurs. If Job01 has a 6 minute average runtime under Level1, then an alert will not occur unless the job runs more than 11 minutes. Similarly for jobs falling within the above parameters set for Level 2, any job with an average execution time falling between 0 and 60 minutes will be allowed 10 minutes of tolerance. In other words, if a Job02 normally runs a 4 minute average, then the Job02 process can run for 14 minutes before an alert is flagged or initiated. The same reasoning is applied to jobs falling within each of the other levels presented above.

The Runtime Monitoring Agent 80 also utilizes an Exclusion File which contains the names of all files which are excluded from alert notification if the current runtime for the job is outside of the tolerance range of times for the given job. For an example if a Job01 having a tolerance value of 10 minutes runs for more than 10 minutes beyond it's average runtime, then an alert will be issued for Job01 unless the Exclusion File lists Job01 for exclusion.

A sample file format for a RuntimeMonitor.excludes file (exclusion file) is: <job_name>|<date>. For example, the following exclusion file data: Job1|09152011 and Job2|08172011 defines 2 job exclusions. The first job named Job01 will be excluded from monitor alerts until the 15 Nov.

2011 (09152011). The second job named Job02 will be excluded until Aug. 17, 2011 (08172011).

There can be various reasons for a job to be listed in the Exclusion File but in any event, displaying or otherwise notifying the user of a job alert does not stop the job from continuing to completion.

Monitoring can be set to any desired interval such as monitoring every 10 seconds, or every two minutes. The Runtime Monitoring Agent 80 in step 24 of FIG. 2 can populate and update the Runtime Monitoring Table 64 at each monitoring interval. The Runtime Monitoring Table 64 is a database which stores data constantly being updated by the Runtime Monitoring Agent 80 for each running job. Once a given job is completed, the complete runtime data for that job is transferred from the Runtime Monitoring Table 64 to the Job Stats Table 66 which acts as a historical database of all jobs which have been run on all different, incompatible platforms.

In step 26 average runtimes are determined for each job based on a mean average of runtimes for the same job completed in the past and stored in the Job Stats Table 66. The average runtime for a given job is stored in the Job Stats Table 66 and updated whenever new data is available. Different types of averages can be calculated and saved in the Job Stats Table 66 if desired. For instance rather than using a mean average, the average can be calculated as a median average or a mode average.

A successful completion time for each given job is determined in step 28, saved in the Runtime Monitoring Table 64, then transferred with the rest of the runtime data about the job to the Job Stats Table 66. For example, if J1 started at 9:00 am today and was completed at 10:50 am then the Runtime Monitoring Agent 80 determines the completion time of 1 hour, 50 minutes and the completion time data will be archived in the Job Stats Table 66.

In step 30 a determination is made whether a completed job is subject to alert exclusion by comparing the given job, for example J1, with an exclusion list or Exclusion File located in the Job Stats Table 66. If the completed job J1 is excluded from alert notification, then the Runtime Monitoring Table 64 is updated to list the exclusion in step 32. If there is no exclusion for J1, then the alert will be displayed in step 34.

Finally a list of jobs currently running is displayed in step 36 to an user on the display 72. Options are available to also display all scheduled and completed jobs for a given period of time (e.g a current work day or work week). Of course if a given job is not yet complete, then the monitoring process by the Runtime Monitoring Agent 80 continues to update the status of the job for viewing by the system administrator as described throughout the steps of the method of FIG. 1 as described above The status of all jobs currently running are displayed together in a single list on a single display monitor, even though the jobs are running on different incompatible platforms or computer systems and software. Furthermore, the system administrator has the option of displaying any information that has been monitored and saved for any jobs, past, present or future. In other words, the user can pull up and display historical job data from the Job Stats Table 66, job scheduling data from the Job Tracking Table 62, and status data for currently running jobs from the Runtime Monitoring Table 64, irregardless of the fact that these jobs have been run, will be run, or are running on different, incompatible computer platforms which typically require separate scheduling, real time monitoring and maintenance.

Figure 4A:
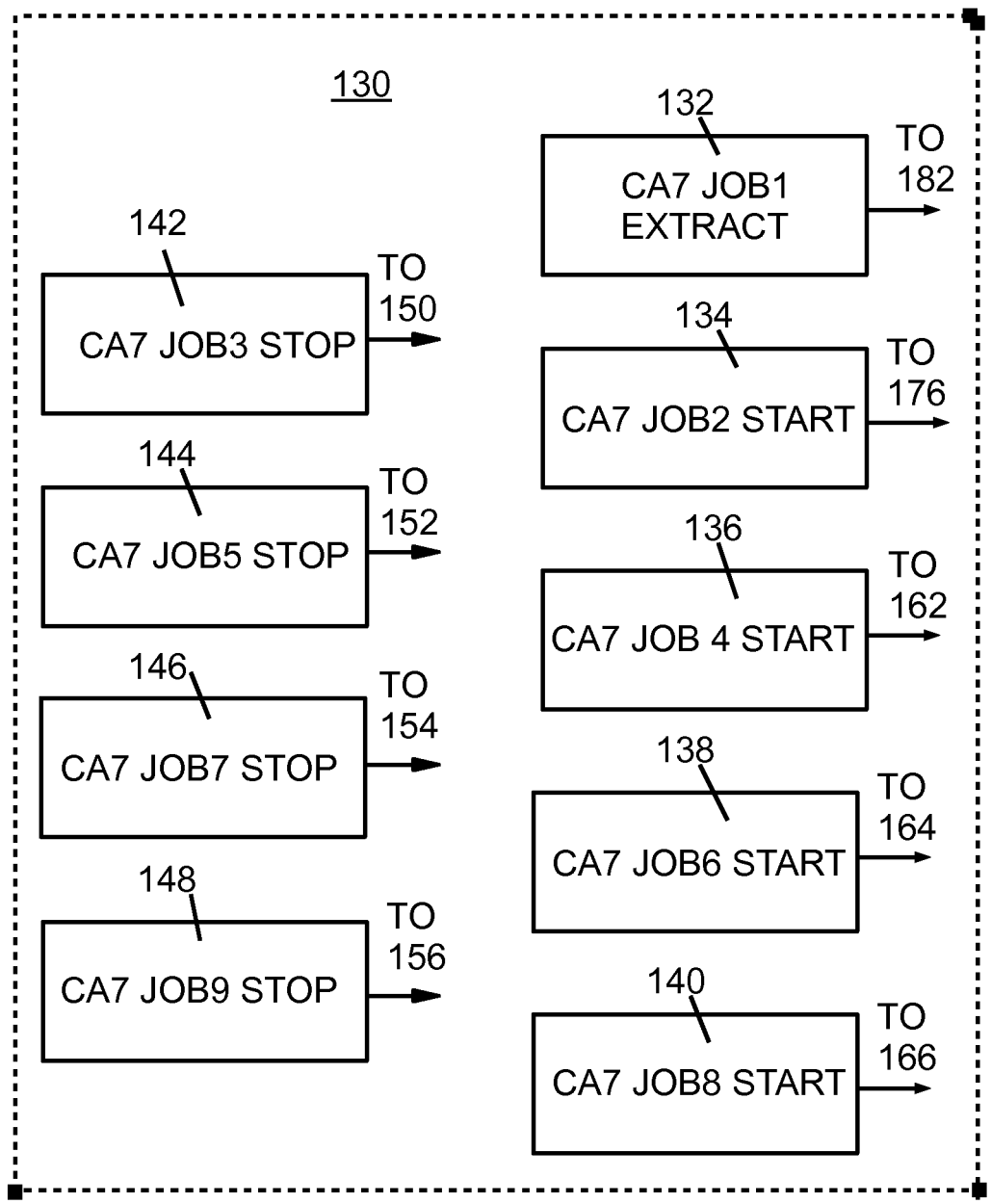
FIGS. 4A, 4B and 4C together are a graphical representation of a Runtime Monitor work flow in accordance with the principles of the invention.

In one embodiment, a CA7 job scheduling and workflow automation software package is used as the scheduler for the job workflow to provide scheduling information as shown in the block diagram of a CA7 platform in FIG. 4A. CA7™ is a software package sold by CA Technologies, formerly CA, Inc. and Computer Associates International, Inc. It is commonly used by banks and other large enterprises with IBM mainframe information technology IT computing platforms.

Figure 3:
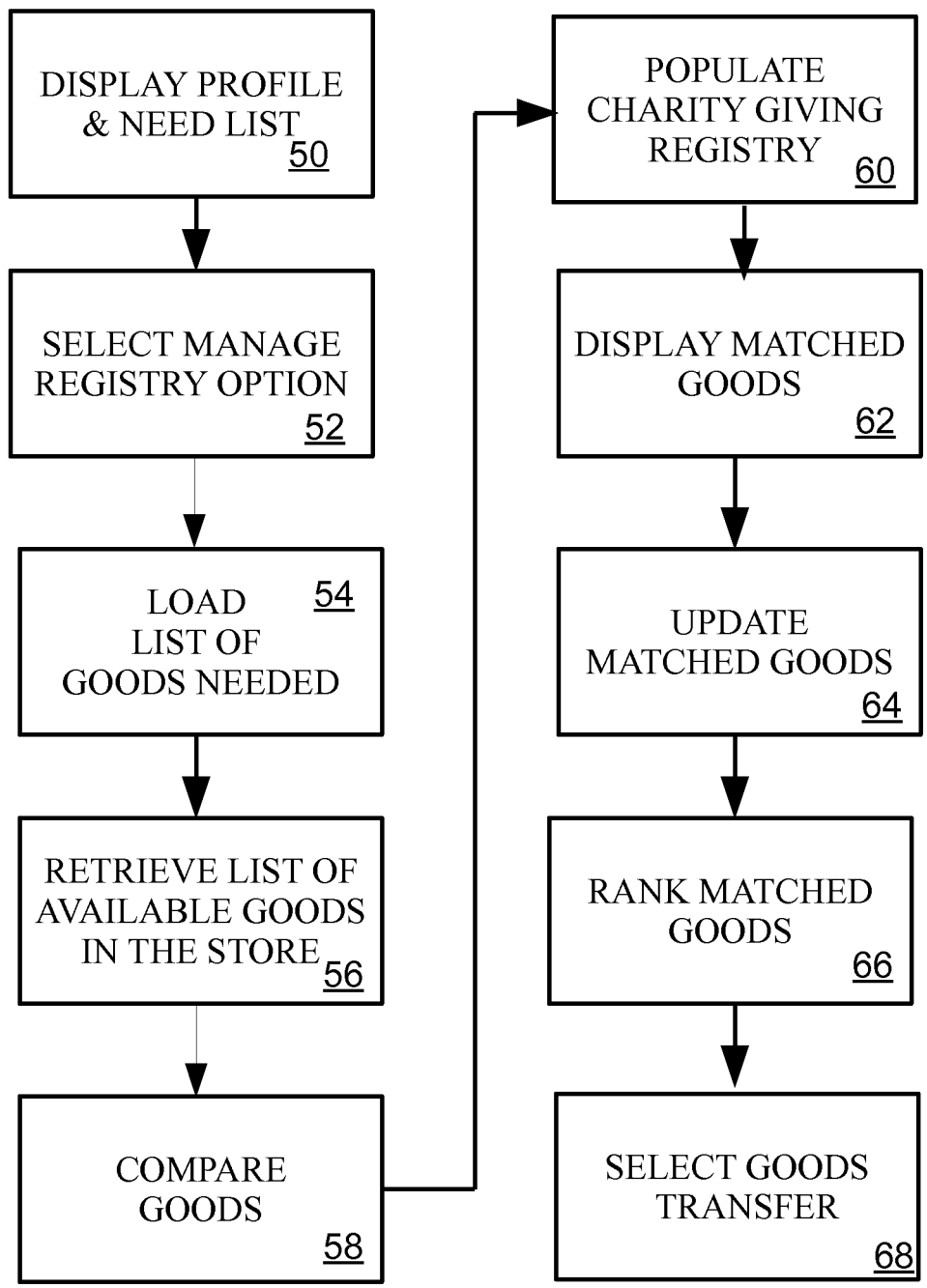
FIG. 3 is a graphical representation of Runtime Monitor object workflow in accordance with the principles of the invention.

FIG. 3 is a graphical block diagram representation of Runtime Monitor object workflow in accordance with the principles of the invention. In FIG. 3 a first thread 100 starts at block 102 and runs a FileMonitor object 104 in real time. The FileMonitor object 104 tails the CA7 log file 110 (e.g. CA7 log files 172, 202, 222, 242 in FIG. 4C) and notifies a CA7LogFileEventListener object 106 when a new record is available. The CA7RuntimeStatsTracker object 108 receives updates from the CA7LogFileEventListener object 106 and then updates the Runtime Monitoring table 64 (included as part of the tables 112 in FIG. 3) with job details.

A second thread 120 in FIG. 3 starts at block 122 and runs a RuntimeMonitor object 124 which notifies a RuntimeMonitorEventListener 126 which in turn provides data to the Job Stats table 66 included in tables 112. The RuntimeMonitor object 124 monitors the Job Stats table 66 via the CA7RuntimeStatsTracker object 108. The RuntimeMonitor object 124 also notifies the RuntimeMonitorEventListener 126 when a job is alerted by exceeding the tolerance of the acceptable time range for completion of the job. When an alert is detected, then an email and/or page is sent to a group defined in a properties file stored in the Job Stats table, and an alert is registered in the Runtime Monitor table 64 (included as part of the tables 112) for that job.

Figure 4B:
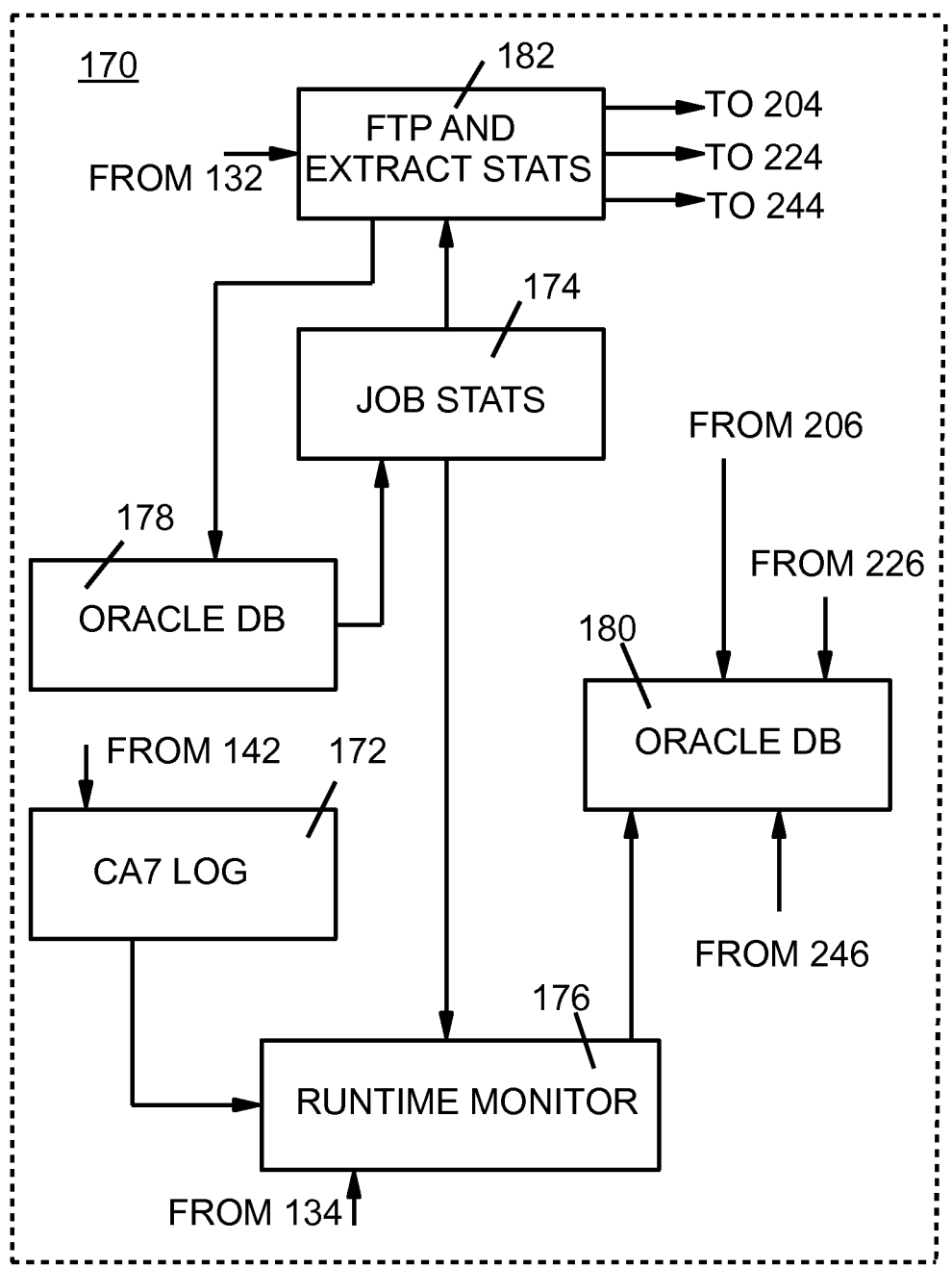
Figure 4C:
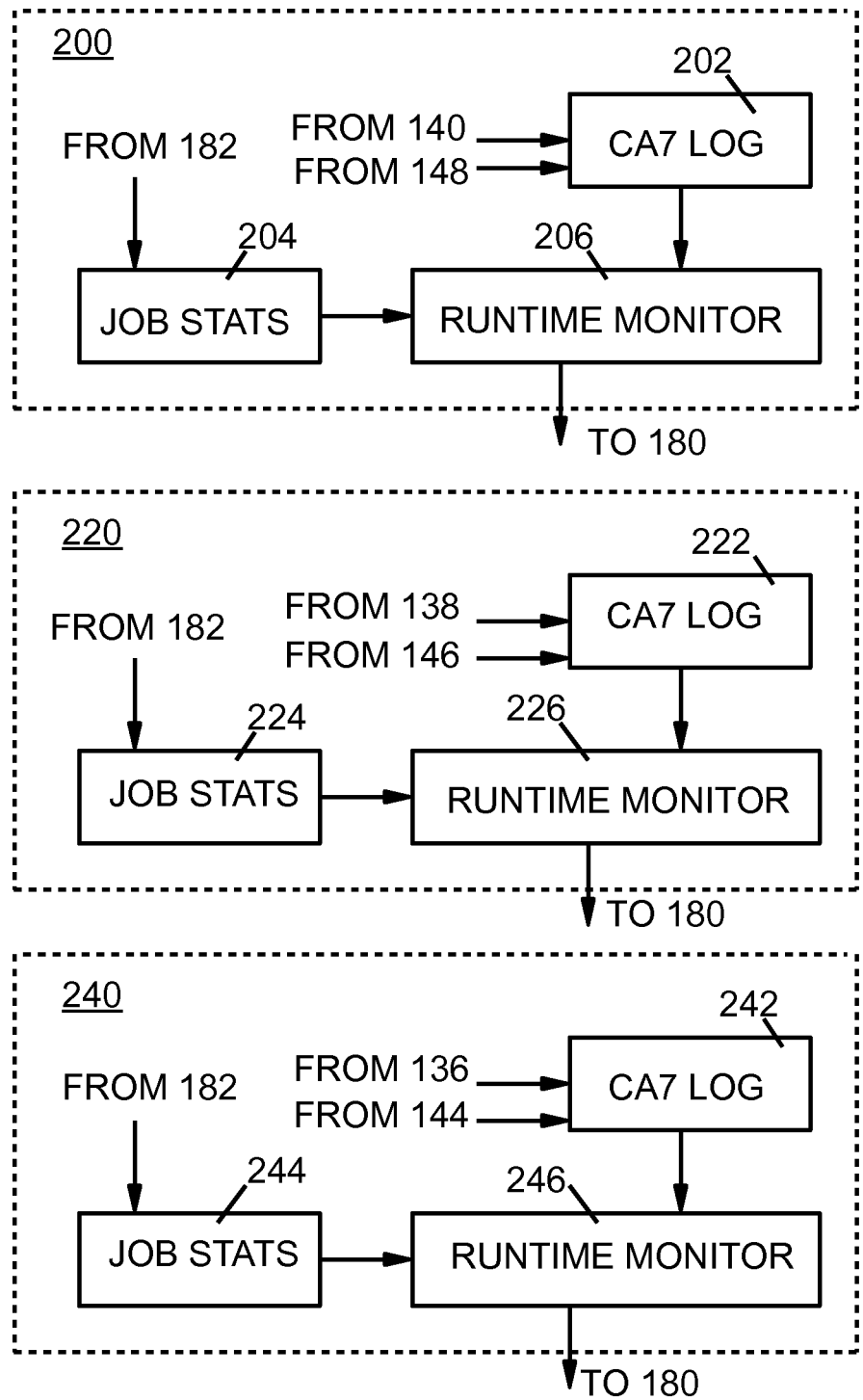

FIGS. 4A, 4B and 4C together provide a graphical representation of a Runtime Monitor work flow. The Runtime Monitoring Agent 80 of FIG. 2 (also referred to herein as the "Runtime Monitor") is an Unix shell script running a Java process that runs on different environments such as a database tier 170, an application tier 200, a grid tier 220 and a Datastage™ tier 240.

FIG. 4A is a block diagram of the scheduling portion 130 of a Runtime Monitor job flow utilizing CA7 scheduling/workflow software. Java file 132 (CA7Job1) is located on the mainframe for executing a script on the database tier 170 via FTP and statistics extractor interface 182. File 132 extracts job runtime statistics for a process/job and loads the job runtime statistics to the Job Stats table 66.

In this example, the CA7 java files of CA7 platform 130 include: a start job file 134 (CA7Job2), a start job file 136 (CA7Job3), a start job file 138 (CA7Job4), a start job file 140 (CA7Job5), a stop job file 142 (CA7Job2), a stop job file 144 (CA7Job3), a stop job file 146 (CA7Job4) and a stop job file 148 (CA7Job5). The start job files 134, 136, 138 and 140 are used to start the file monitoring jobs Job01, Job02, Job03 and Job04 respectively, and the stop job files 142, 144, 146 and 148 are used to stop the jobs.

In FIGS. 4B and 4C the Runtime Monitor is labeled as Runtime Monitor 176, 206, 226 and 246, respectively. This is the same Java programmed Runtime Monitoring Agent 80 previously described in relation to FIG. 2. The Runtime Monitor keeps track of long running processes by monitoring the CA7 log files 172, 202, 222 respectively for the database tier 170, the application tier 200, the grid tier 220 and the Datastage tier 240 based on job statistics. The CA7 log files are populated with scheduling data from the CA7 platform 130, such as start and stop times for each of the separate application platforms, i.e. the database tier 170, the application tier 200, the grid tier 220 and the Datastage tier 240.

As previously mentioned, job statistics for each job are stored in a Job Stats table and include, but are not limited to, average run times with outliers (i.e. abberrant run times) removed, run percentages viewed over a period of time, etc.

For each batch job running on a Unix server, there is a mainframe job control language (JCL) that will make a call to a CA7 agent running on the Unix side. JCL is a scripting language used on IBM mainframe operating systems to instruct the system on how to run a batch job or start a subsystem. Batch job processing is the execution of a series of programs or jobs on a computer without manual intervention.

The CA7 agent runs a command handed off to it from the JCL and inserts a job initialization (JOBINIT) record into a CA7 log such as the CA7 log 172 located in the database tier 170 of FIG. 4B, or the CA7 logs 202, 222, 242 located in FIG. 4C. When the job finishes, the CA7 agent is notified and a job termination (JOBTERM) record is inserted for the job into the job stats table 66. The Runtime Monitor java process tails this log and watches for the JOBINIT/JOBTERM records. The above process relies on the existence of the Runtime Statistics file, the Tolerance file, and the Exclusion file.

FIG. 4B presents a RunTime Monitor job flow for a database tier 170 including a Job Runtime Stats File 174 contains an average time for each and every job that is run and monitored by the Runtime Monitoring object 176 of the workflow monitoring system. The Job Runtime Stats File 174 contains a record for each job in a format such as: <job_name>|<runtime>|<run_percent>. An example would be "Job1|00000.49|0090" meaning that Job1 has run an average of 0.49 minutes over a predetermined period of time, e.g. the past 10 months, and Job1 has run for 90% of the past 10 months. In other words, if the past calendar time=10 months, then Job1 has run on 9 of those 10 months with an average runtime of 0.49 minutes in each instance.

In addition to the Job Runtime Stats File 174 and the Runtime Monitoring object 176, the RunTime Monitor job flow of FIG. 4B for the database tier 170 also includes: a CA7 log 172; an FTP and statistics extractor interface 182; an Oracle database table 178 for all extraction job statistics; and an Oracle database table 180 for inserting runtime statistics for display on an user monitor. File transfer protocol (FTP) is a standard for the exchange of program and data files across a network.

Similar examples to the one above can be presented for a RunTime Monitor job flow for: (1) an application tier 200 having a Runtime monitor file 206, a CA7 log 202 and a Job Runtime Stats File 204; (2) a grid tier 220 having a Runtime monitor file 226, a CA7 log 222 and a Job Runtime Stats File 226; and (3) a Datastage tier 240 having a Runtime monitor file 246, a CA7 log 242 and a Job Runtime Stats File 244.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method for providing a webpage job monitoring and scheduling application, the method comprising:
    scheduling a plurality of jobs resident and running on different non-compatible platforms and to a scheduled jobs tracking table, wherein each platform of the different non-compatible platforms comprises a runtime monitoring agent,
    monitoring periodically, by said runtime monitoring agent, for each of the plurality of jobs on each of the different non-compatible platforms: (1) a start time, (2) an end time, (3) a current runtime, (4) an average runtime, (5) an acceptable completion time of a job of the plurality of jobs defined as falling within a period equaling a sum of the average runtime and a predetermined tolerance value, whereby an alert is initiated when the current runtime of a job of the plurality of jobs exceeds the respective job's acceptable completion time, and (6) an exclusion list of jobs excluded from being alerted,
    wherein a batch job is excluded from being alerted based on its presence in the job exclusion list and further based on its respective start and stop times;
    wherein the scheduling and the monitoring of the plurality of jobs further comprises:
    utilizing, by said runtime monitoring agent, a statistics file comprising the average runtimes for completion of each job of the plurality of jobs, a tolerance file comprising the acceptable completion times for each job of the plurality of jobs based upon the job's respective average completion time, and an exclusion file containing the names of all files which are excluded from alert notification if the current runtime for the job of the plurality of jobs is outside of the tolerance range of times for the given job; and
    determining the average run time for a completed job of the plurality of jobs based on historical runtime data prior to determining whether the completed job is subject to alert exclusion,
    saving, by the runtime monitoring agent, job data of each of the scheduled jobs that have completed in a predetermined format for each of the plurality of jobs to a job stats table,
    receiving, from said runtime monitoring agent the statistics file, the tolerance file, and the exclusion file;
    storing, in the job stats table, the statistics file, the tolerance file, and the exclusion file;
    displaying on a single display the job stats table data including alerts associated with jobs that have exceeded the acceptable completion time.

2. The method of claim 1 wherein the average runtime is a mean average time in which previous jobs have been completed.

3. The method of claim 1 wherein the alert comprises an email notification, a pop-up screen, flashing text, highlighted text and colored text.

4. The method of claim 1 wherein each job on the exclusion list has an expiry date after which the exclusion of the alert expires.

5. The method of claim 1 wherein the current runtime of each of the plurality of jobs is a lapsed time measured from the start time to the current time.

6. The method of claim 1 wherein the job stats table comprises parameters for each of the plurality of jobs including: job names, start times, end times, run times, run dates, platform names, average runtimes, tolerance ranges and alerts.

7. The method of claim 1 wherein the plurality of jobs includes batch jobs comprising accounts payable, accounts receivable, product stocking, product reordering, payroll, purchase of goods, sales of goods, employee work schedule, delivery schedule, shipping schedule, replenishment forecasts, logistics workflow triggering, and item file information.

8. The method of claim 1 further comprising the runtime monitoring agent updating a runtime monitoring table with data for each of the plurality of jobs.

9. The method of claim 8 further comprising fetching data from the runtime monitoring table of the plurality of jobs running on different non-compatible platforms to display on a display screen.

10. The method of claim 1 further comprising fetching data from the scheduled jobs tracking table to display jobs of the plurality of jobs resident and running on different non-compatible platforms scheduled on a display screen.

11. A computer-implemented method for providing a webpage job monitoring and scheduling application, the method comprising:
    scheduling a plurality of jobs resident and running on different non-compatible platforms and to a scheduled jobs tracking table, wherein each platform of the different non-compatible platforms comprises a runtime monitoring agent;
    monitoring periodically the plurality of jobs resident and running on different non-compatible platforms with said runtime monitoring agent, said runtime monitoring agent for each of the plurality of jobs on each of the different non-compatible platforms monitoring and saving in a job stats table (1) a start time, (2) an end time, and (3) a current runtime, and wherein the jobs tracking table stores and tracks job data for each job;

wherein the scheduling and the monitoring of the plurality of jobs further comprises:

utilizing, by said runtime monitoring agent, a statistics file comprising the average runtimes for completion of each job of the plurality of jobs, a tolerance file comprising the acceptable completion times for each job of the plurality of jobs based upon the job's respective average completion time, and an exclusion file containing the names of all files which are excluded from alert notification if the current runtime for the job of the plurality of jobs is outside of the tolerance range of times for the given job;

populating, via the runtime monitoring agent, a runtime monitoring table comprised of a list of the plurality of jobs running;

receiving, from said runtime monitoring agent the statistics file, the tolerance file, and the exclusion file;

determining and saving in the job stats table an average runtime for each of the plurality of jobs that have completed running on the different non-compatible platforms based on historical data stored within the job stats table, wherein the job stats table further stores the statistics file, the tolerance file, and the exclusion file used by the runtime monitoring agent for processing the jobs resident and running on the different non-compatible platforms;

determining and saving within the job stats table an acceptable completion time for each of the plurality of jobs running, the acceptable completion time defined as falling within a period equaling a sum of the average runtime and a predetermined tolerance value;

determining and saving within the runtime monitoring table whether a given running job is subject to an alert exclusion by examining a predetermined exclusion list of jobs stored within the job stats table;

saving an alert into the runtime monitoring table when the current runtime of the given running job exceeds the sum of the average runtime and the predetermined tolerance value for the given running job, and when the given running job is not subject to alert exclusion; and displaying the list, including alerts associated with jobs that have exceeded the acceptable completion time, on a display from the runtime monitoring table of the plurality of jobs running.

12. The method of claim 11 wherein the job stats table comprises parameters for each of the plurality of jobs including: job names, start times, end times, run times, run dates, platform names, average processing times, tolerance ranges and alerts.

13. The method of claim 11 wherein the plurality of jobs comprises accounts payable, accounts receivable, product stocking, product reordering, payroll, purchase of goods, sales of goods, employee work schedule, delivery schedule, shipping schedule, replenishment forecasts, logistics workflow triggering, and item file information.

14. A computer program product, comprising: a non-transitory computer readable storage medium having computer readable program code embodied therewith, the computer readable program code comprising:

computer readable program code configured to schedule a plurality of jobs resident and running on different non-compatible platforms and to a scheduled jobs tracking table, wherein each platform of the different non-compatible platforms comprises a runtime monitoring agent, computer readable program code configured to monitor periodically by the runtime monitoring agent (1) a start time, (2) an end time, (3) a current runtime, (4) an average runtime, (5) an acceptable completion time of a job of the plurality of jobs defined as falling within a period equaling a sum of the average runtime and a predetermined tolerance value, whereby an alert is initiated when the current runtime of the job exceeds the acceptable completion time, and (6) an exclusion list of jobs excluded from being alerted, wherein a batch job is excluded from being alerted based on its presence in the job exclusion list and further based on its respective start and stop times, computer readable program code configured to utilize, by said runtime monitoring agent, a statistics file comprising the average runtimes for completion of each job of the plurality of jobs, a tolerance file comprising the acceptable completion times for each job of the plurality of jobs based upon the job's respective average completion time, and an exclusion file containing the names of all files which are excluded from alert notification if the current runtime for the job of the plurality of jobs is outside of the tolerance range of times for the given job;

computer readable program code configured to determine the average run time for a completed job of the plurality of jobs based on historical runtime data prior to determining whether the completed job is subject to alert exclusion;

computer readable program code configured to save job data of each of the scheduled jobs that have completed in a predetermined format to a job stats table via the runtime monitoring agent, computer readable program code configured to receive, from said runtime monitoring agent the statistics file, the tolerance file, and the exclusion file;

computer readable program code configured to store within the job stats table the statistics file, the tolerance file, and the exclusion file used by the runtime monitoring agent for processing the jobs running on the different non-compatible platforms; and computer readable program configured to display the job stats table data including the alerts associated with jobs that have exceeded the acceptable completion time on a display.

15. A system for monitoring and scheduling processes in a computer system, the system comprising:

a central processing unit of a computer comprising a plurality of Java runtime monitoring agents for scheduling a plurality of jobs resident and running on different non-compatible platforms and to a scheduled jobs tracking table, wherein each of the different non-compatible platforms comprises a Java runtime monitoring agent, said Java runtime monitoring agent for each of the plurality of jobs on each of the different non-compatible platforms monitoring periodically job data including (1) a start time, (2) an end time, (3) a current runtime, (4) an average runtime, (5) an acceptable completion time of a job of the plurality of jobs defined as falling within a period equaling a sum of the average runtime and a predetermined tolerance value, whereby an alert is initiated when the current runtime of the a job of the plurality of jobs exceeds the respective job's acceptable completion time, and (6) an exclusion list of jobs excluded from being alerted, wherein the scheduling and the monitoring of the plurality of jobs further comprises:

the Java runtime monitoring agent utilizing a statistics file comprising the average runtimes for completion of each job of the plurality of jobs, a tolerance file comprising the acceptable completion times for each job of the plurality of jobs based upon the job's respective average completion time, and an exclusion file containing the names of all files which are excluded from alert notification if the current runtime for the job of the plurality of jobs is outside of the tolerance range of times for the given job;

one or more memory devices in the computer for storing the job data of each of the scheduled jobs that have completed provided by the runtime monitoring agent in a predetermined format for each of the plurality of jobs;

the one or more memory devices for receiving, from said Java runtime monitoring agent, the statistics file, the tolerance file, and the exclusion file and storing, in the job stats table, the statistics file, the tolerance file, and the exclusion file used by the Java runtime monitoring agent for processing the jobs running on the different non-compatible platforms;

a display to display the job data and alerts associated with jobs that have exceeded the acceptable completion time that are stored on the one or more memory devices.

16. The system of claim 15 wherein the average runtime is a mean average time in which previous jobs have been completed.

17. The system of claim 15 wherein the alert comprises an email notification, a pop-up screen, flashing text, highlighted text and colored text.

18. The system of claim 15 wherein each job on the exclusion list has an expiry date after which the exclusion of the alert expires.

19. The system of claim 15 wherein the current runtime of each of the plurality of jobs is a lapsed time measured from the start time to the current time.

20. The system of claim 15 wherein the job data further comprises job names, run dates and platform names.

21. The system of claim 15 wherein the plurality of jobs includes batch jobs comprising accounts payable, accounts receivable, product stocking, product reordering, payroll, purchase of goods, sales of goods, employee work schedule, delivery schedule, shipping schedule, replenishment forecasts, logistics workflow triggering, and item file information.

* * * * *